United States Patent
Thornton et al.

(10) Patent No.: US 10,748,151 B2
(45) Date of Patent: Aug. 18, 2020

(54) FINANCIAL CARD PROTECTION SYSTEM

(71) Applicant: TWA SYSTEMS LLC, Little River, SC (US)

(72) Inventors: Wayne L. Thornton, Little River, SC (US); Timothy A. Stier, Little River, SC (US); Alexander R. Lopez, Little River, SC (US)

(73) Assignee: TWA SYSTEMS LLC, Myrtle Beach, SC (US)

( * ) Notice: Subject to any disclaimer, the term of this patent is extended or adjusted under 35 U.S.C. 154(b) by 0 days.

(21) Appl. No.: 16/028,864

(22) Filed: Jul. 6, 2018

(65) Prior Publication Data
US 2020/0013058 A1 Jan. 9, 2020

(51) Int. Cl.
*G06Q 20/40* (2012.01)
*G06Q 20/32* (2012.01)
*G06Q 20/34* (2012.01)

(52) U.S. Cl.
CPC ......... *G06Q 20/401* (2013.01); *G06Q 20/322* (2013.01); *G06Q 20/3224* (2013.01); *G06Q 20/34* (2013.01)

(58) Field of Classification Search
CPC .............................. G06Q 20/401; G06Q 20/34
USPC .......................................................... 705/44
See application file for complete search history.

(56) References Cited

U.S. PATENT DOCUMENTS

| 2,268,632 A * | 1/1942 | Anderson | G09B 29/10 33/1 SD |
| 2003/0236777 A1* | 12/2003 | Conway | G06F 9/466 |
| 2008/0035725 A1 | 2/2008 | Jambunathan et al. | |
| 2009/0327134 A1* | 12/2009 | Carlson | G06Q 20/04 705/44 |

(Continued)

FOREIGN PATENT DOCUMENTS

| JP | 2003150883 A | 5/2003 |
| JP | 2003150884 A | 5/2003 |

(Continued)

OTHER PUBLICATIONS

"CardValet®—Your Debit Card on Your Terms," 1st Source® Bank website, Copyright 1999-2017.

*Primary Examiner* — Joseph W. King
(74) *Attorney, Agent, or Firm* — Nath, Goldberg & Meyer; Joshua B. Goldberg

(57) ABSTRACT

The system to improve protection of financial cards during and prior to use includes a financial company server, a financial card assigned to a customer and the customer's mobile electronic devices. The company server has a software program that handles account monetary requests that come through financial networks. The server communicates with the owner/customer of the card via the mobile electronic devices. An application is supplied by the financial company for the card holder's devices. When a transaction is attempted, the system determines the distance between the attempted card transaction and the card holder's device. Based on the calculated distance compared to a stored limit, (Continued)

a suggestion to deny or accept the transaction is displayed on the device, as well as virtual accept and deny buttons. A map of the transaction and the device may be displayed, to assist the customer in their decision to accept or deny the transaction.

17 Claims, 5 Drawing Sheets

(56) References Cited

U.S. PATENT DOCUMENTS

| | | | | |
|---|---|---|---|---|
| 2011/0007074 A1* | 1/2011 | Sakashita | ............ | G01C 21/367 |
| | | | | 345/428 |
| 2012/0244885 A1* | 9/2012 | Hefetz | ................... | G06Q 20/32 |
| | | | | 455/456.2 |
| 2012/0246076 A1 | 9/2012 | Kobayashi | | |
| 2012/0323786 A1* | 12/2012 | Kirsch | ............... | G06Q 20/0855 |
| | | | | 705/44 |
| 2016/0125412 A1* | 5/2016 | Cannon | .............. | G06Q 20/4014 |
| | | | | 705/44 |

FOREIGN PATENT DOCUMENTS

| | | | |
|---|---|---|---|
| KR | 20040021425 A | | 3/2004 |
| KR | 20060006199 A | * | 1/2006 |

\* cited by examiner

_US 10,748,151 B2_

FINANCIAL CARD PROTECTION SYSTEM

BACKGROUND

1. Field

The disclosure of the present patent application relates to financial security systems, and more specifically to a system and method to improve protection of financial cards during and prior to use.

2. Description of the Related Art

Financial companies at times use software and/or hardware systems to handle account monetary requests that come through financial networks, to monitor changes to a card account, and to provide full control on how and where the card can be used. The systems can communicate with the owner/customer of the card via one or more portable electronic devices supported by the company. It is assumed the customer will have at least one such device with them, especially when not at home, whether the customer owns the device or not. An application (app) is supplied by the financial company for the customer selected device.

In current practice, the use of the card causes data to be exchanged with the financial company. A communication protocol, such as ISO 8583, is used for the information transfer. The company applies its criteria for acceptance or rejection and sends back the decision. The company has no way of knowing whether the actual card user is an authorized person, other than that the person has the card. Some systems require a passcode to be entered, some not. The user may have a device with them that runs the company's app, but to date it is not involved in the identification process. The criteria used by the company may include setting a currency value for automatic approval of monetary requests. Card fraud operators often defeat this type of protection by first testing with a single withdrawal of less than one dollar. If that succeeds, then they will try a much larger amount. If that fails they may try with a decreased amount, and so on, until a substantial amount of money is withdrawn. This is only one example of the many types of fraud perpetrated on debit cards, credit cards, etc. Thus, a system to improve protection of such cards solving the aforementioned problems is desired.

SUMMARY

The present subject matter relates to a system to improve protection of financial cards during and prior to use, including a server or other hardware that may be located at a financial company or other location, a financial card assigned to a customer (or customers) and the customer's mobile electronic device or devices. In some embodiments, the financial card is a debit card. In some embodiments, the financial card is a credit card. Other types of financial cards can be used in the system. The company server has computer readable memory with a software program that handles account monetary requests that come through financial networks, monitors changes to the card account, and can have full control on how and where the card can be used. The server communicates with the owner/customer of the card via the one or more mobile electronic devices supported by the company. It is suggested to the customer that they have at least one of the supported devices with them, especially when not at home. An application (app) is supplied by the financial company for the card holder's device or devices.

The system determines the distance between an attempted card transaction and the card holder's device. If the distance is more than a value preset by the customer, a suggestion to deny the transaction is displayed on the device. Otherwise a suggestion to accept the transaction is displayed. Two different virtual transaction buttons are then displayed on the device screen: one for acceptance; one for rejection. The buttons are placed side by side with an amount of separation therebetween and may be of different colors, to minimize the customer possibly touching the wrong button. A VIEW MAP button is also displayed. If the VIEW MAP button is touched a screen is displayed showing a map with the customer's location in the center and markers on the customer's location and the transaction business location. Customers do not memorize all the street and address numbers in their town or in any place they visit. Having the map is needed to get a comprehension of the transaction business location in relation to themselves. The customer is given the ability to zoom in or out on the map display, since the transaction business may be very close or very far away. A BACK button returns the customer to the main acceptance/rejection screen.

These and other features of the system to improve protection of financial cards will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
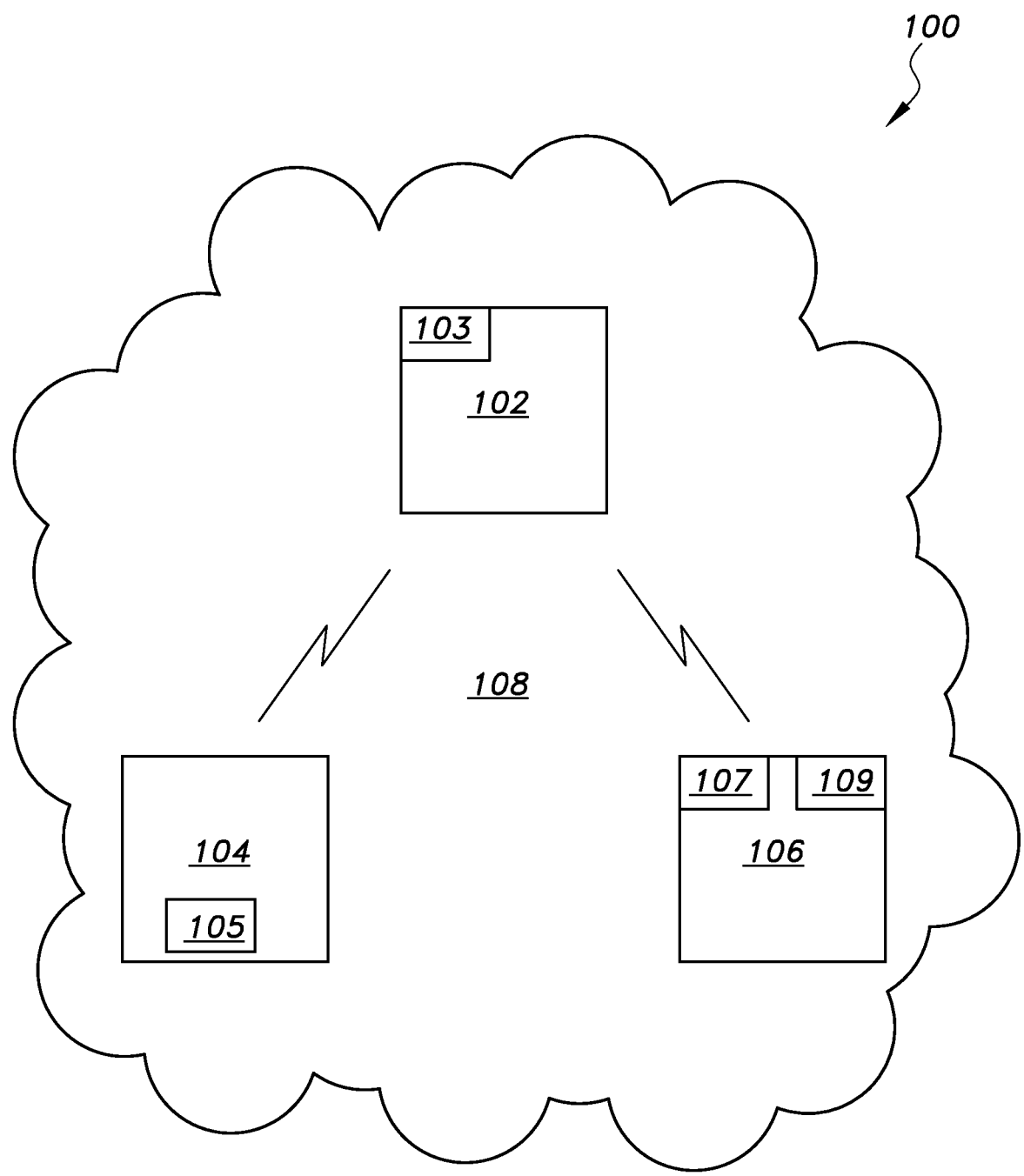
FIG. 1 is a block diagram of the financial card protection system.

The system to improve protection of financial cards 100 is shown in FIG. 1. The system 100 includes a server 102 or other hardware that may be located at a financial company or other location, the server 102 including computer readable memory 103 having software for bank-side operations, including business transaction requests. The software program handles account monetary requests that come through financial networks, monitors changes to the card account, and can have full control on how and where the card can be used. The system also includes a financial card 105 assigned to a customer (or customers) and shown at a business location 104 where a business transaction request is initiated. The system further includes the customers' mobile electronic device 106 (or devices), the device 106 (or devices) including computer readable memory 107 having an app supplied by the financial company, for the customer side operations, and a display screen. The customers' mobile electronic device 106 may also include a global positioning system (GPS) 109 for identifying the location of the customers' mobile electronic device 106. Alternatively, the location of the customers' mobile electronic device 106 may be determined by other means such as the last known use of the device and the cell towers accessed.

The server 102 communicates with the owner/customer of the card 105 on their device 106 via the cloud 108 or over any network or networks. It is important to note that the system to improve protection of financial cards operates with the same security protocol as other existing company apps that are used with customers' devices. In this way the customer already has a secure login system established, independent of the device's security mode.

The app on the customer's device 106 does not need to access the client's information on the company's server, other than for preferred client settings. The system to improve protection of financial cards 100 will also follow the established method of communication between the app and the company system. The system to improve protection of financial cards 100 will not require any deviation to the established security procedures for app development and installation. As an example, a communication protocol, such as ISO 8583, is used for the information transfer.

It is important to note, there is no mechanism for turning off transaction notifications in the app. Since its purpose is to inform the customer on card usage, it's expected the customer will want to know immediately if the card is being used by an unauthorized user, so such transactions can be quickly rejected. Upon attempted use of the card 105, the company server 102 will send the data to the device 106. Use of email or text messaging systems for this communication is not desirable as these methods are extremely susceptible to Denial-Of-Service (DOS) attacks or hacking techniques on the messaging systems or on the device. One type of better data transfer is "push notifications" or similar mechanisms where the device has to be registered with an authoritative notification system, which is secure.

The data transferred may include: business name; business type; business address (example format: 14390 Air and Space Museum Parkway Chantilly, Va. 20151); the monetary amount; date and time; and applicable timeout length. Note that several data values can be combined to create a unique reference number which can be used to determine to which transaction the app is responding. The system to improve protection of financial cards 100 provides an additional layer of security over other existing apps. The intent is to thereby improve protection of the financial company while providing revenue for the financial company in saved losses or also through a small fee associated with the extra protection service for each customer.

As previously described, the use of the financial card 105 causes data to be exchanged with the financial company. As shown in the flow chart 200 of FIG. 2, the software on the computer readable memory 103 on the company server 102 applies its criteria for acceptance or rejection of transactions and sends back the decision to the business location 104. In step 202, the company server 102 receives a transaction request message from a business location 104 processing a purchase/cash advance from the customer's card 105. In step 204, the software on the server 102 retrieves the customer settings for transaction and timeout handling from a database, either on the server, or at a remote location. At step 206, the customer's settings are enacted, such that if the customer has preselected: always approve transactions, the algorithm proceeds to step 208; always deny, the algorithm proceeds to step 210; or activate "DebitGuard™," the algorithm proceeds to step 212.

If the customer has preselected always approve transactions, then in step 208 bank conditions such as available funds, etc. are checked for approval. If approved, the algorithm proceeds to step 214 and communication is sent to the business location 104, approving the transaction. The algorithm then proceeds to step 216 where other bank related actions are performed and the process ends. If denied, the algorithm proceeds to step 210 and communication is sent to the business location 104, denying the transaction. The algorithm then proceeds to step 216 where other bank related actions are performed and the process ends. If the customer has preselected always deny transactions, then the process proceeds to step 210 and continues as described above.

Figure 3:
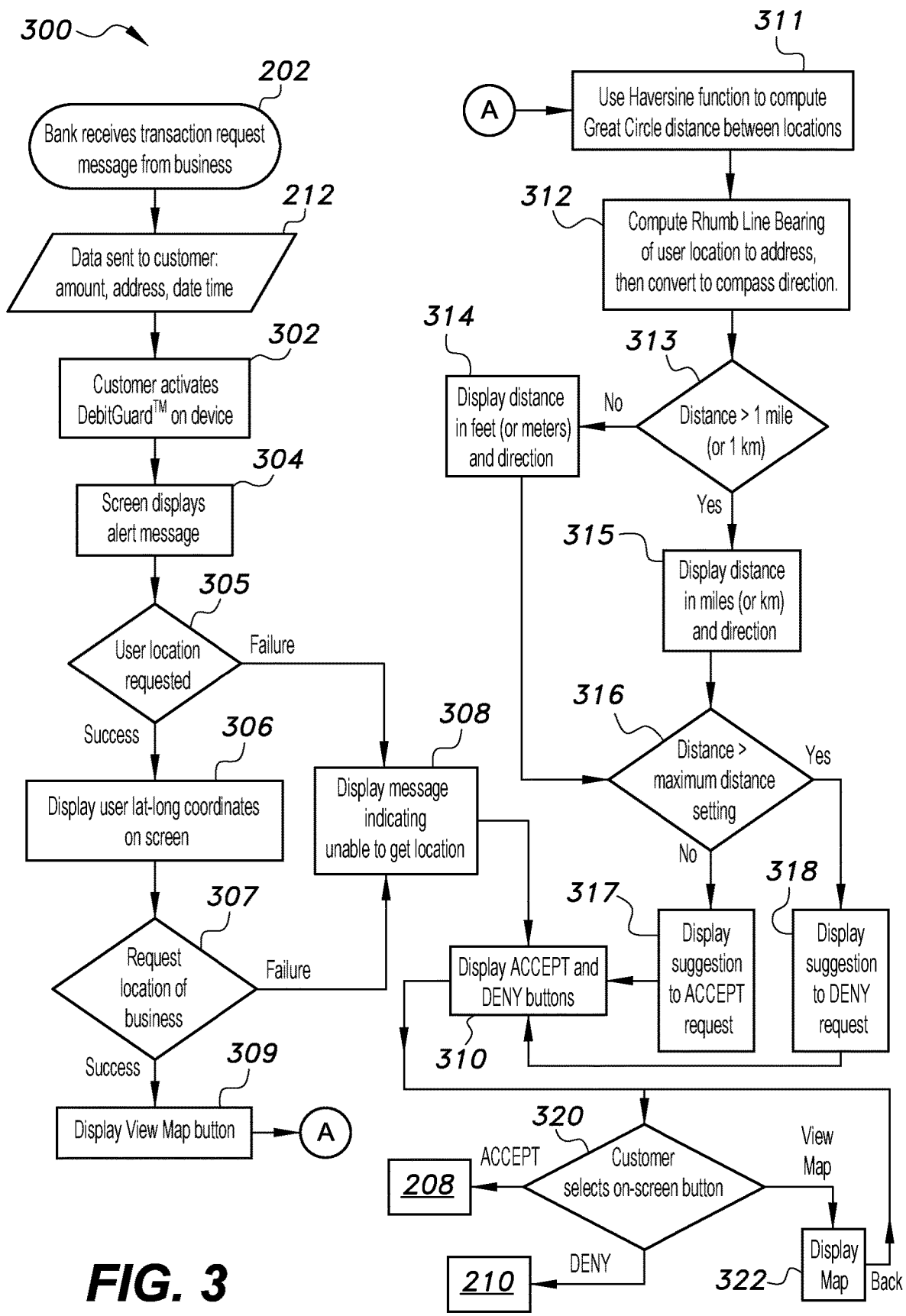
FIG. 3 is a flow chart showing the operation of the financial card protection system.

If the customer has preselected activate "DebitGuard™," the algorithm proceeds to step 212, where the algorithm of FIG. 3. (described below) is performed and a countdown timer is started. The algorithm then proceeds to step 218 where the countdown timer is compared to a preset timer limit. If the customer responds before the timer limit is reached, the process proceeds to step 220. At step 220, the customer's accept/deny decision is received as described below with respect to the algorithm of FIG. 3. If the customer accepts the transaction, then in step 208 bank conditions such as available funds, etc. are checked for approval. If approved, the algorithm proceeds to step 214 and continues as described above. If denied, the algorithm proceeds to step 210 and continues as described above. If the customer denies the transaction, then the algorithm proceeds to step 210 and continues as described above. If the customer does not respond before the timer limit is reached, the process proceeds to step 222. In step 222, the customer's settings are checked. If the customer has preselected approve if cannot be reached, then the process proceeds to step 208 and continues as described above. If the customer has preselected deny if cannot be reached, then the algorithm proceeds to step 210 and continues as described above.

Figure 2:
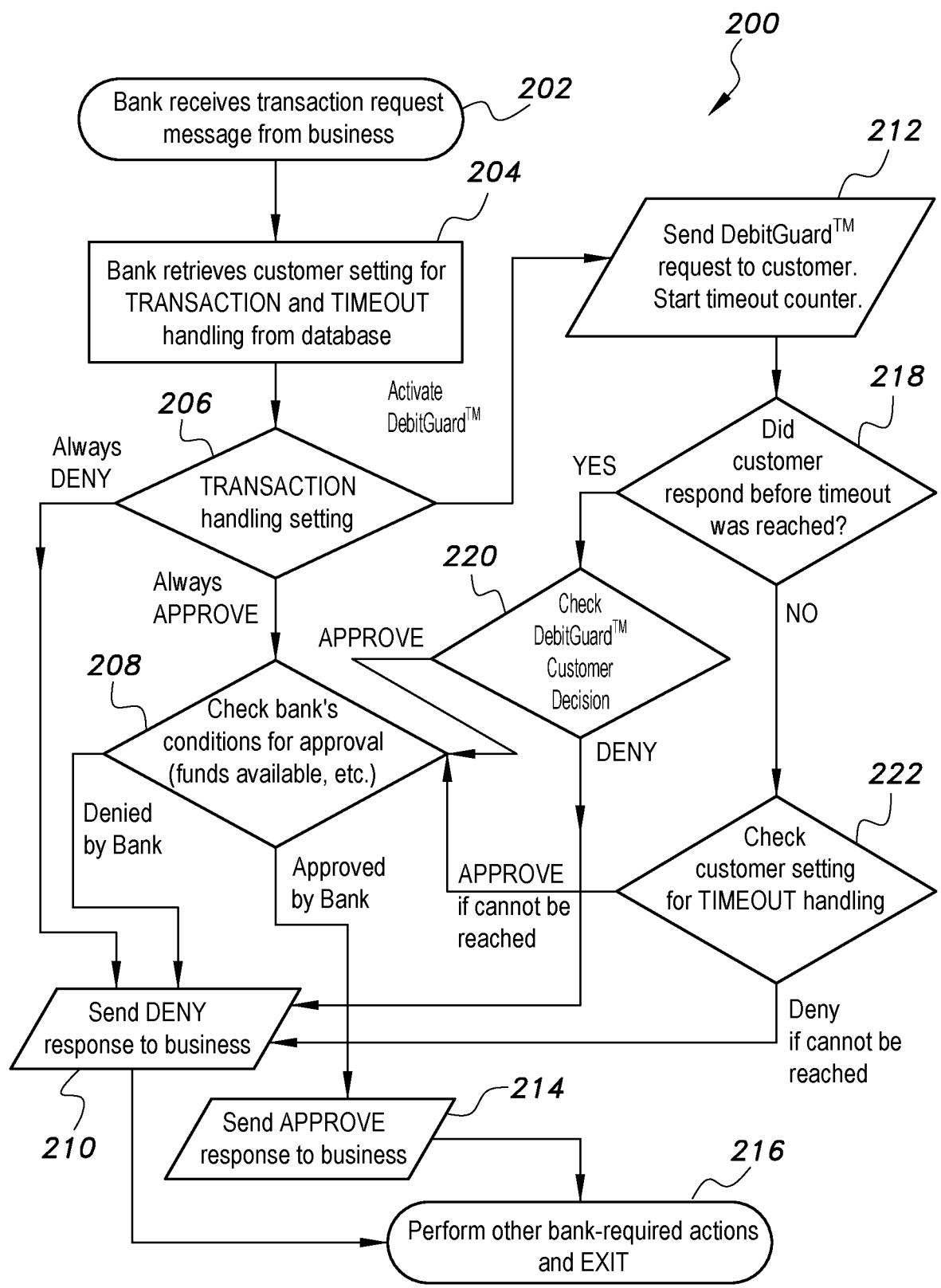
FIG. 2 is a flow chart showing the operation of the bank side transaction request, including the financial card protection system step.
Figure 4:
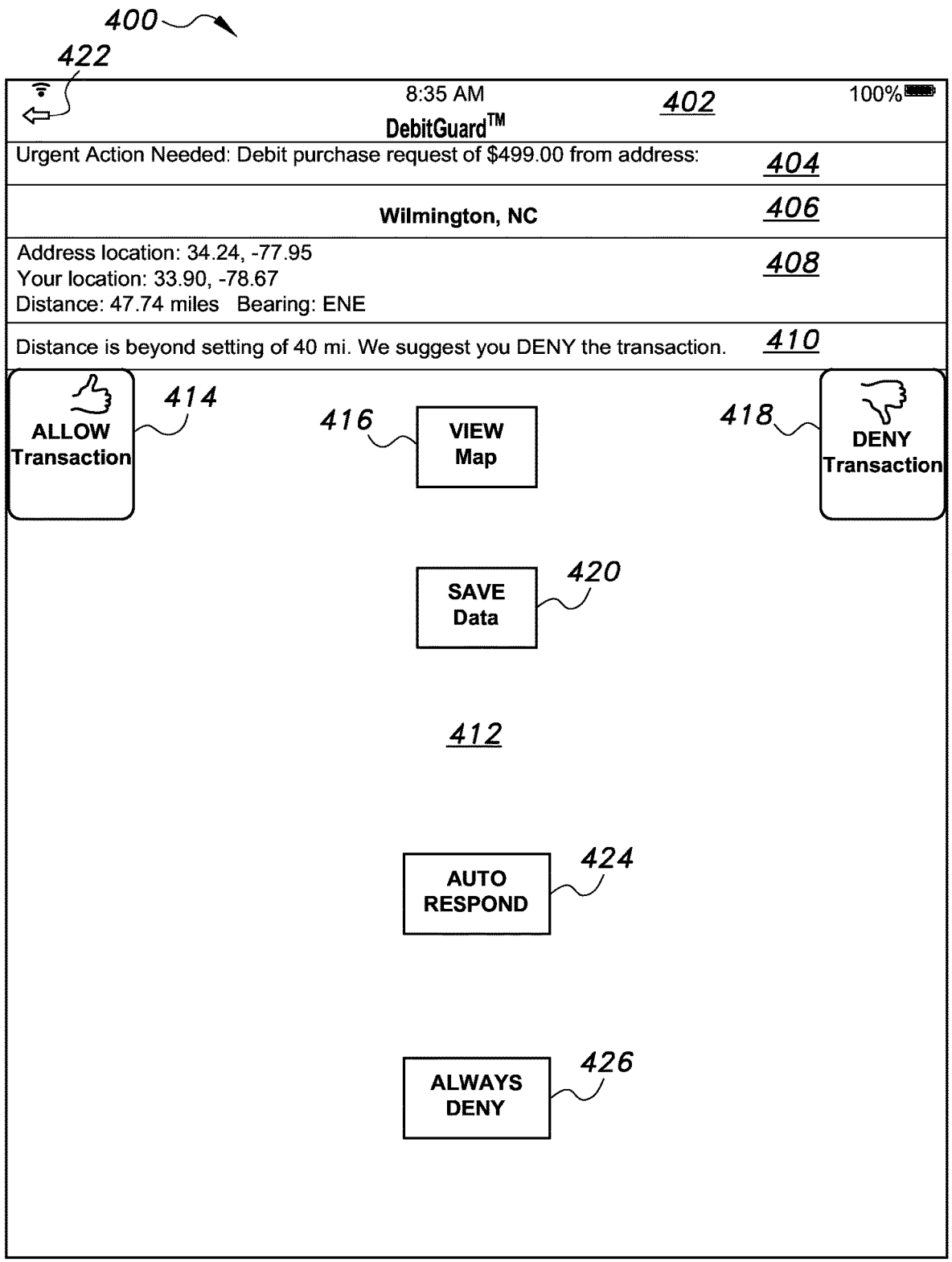
FIG. 4 is a front view of the customer's device, showing an allow/deny screen of the financial card protection system displayed thereon.

FIG. 3 is a flowchart 300 of the app algorithm, while FIG. 4 is a screen shot of the alert page 400 of the app on the user's device 106. As also shown in FIG. 2, in step 202, the company receives a transaction request message from a business location 104 processing a purchase/cash advance from the customer's card 105. As the customer has preselected activate "DebitGuard™," the algorithm proceeds to step 212 where the company server 102 automatically sends data (i.e., amount of transaction, address of business location, date and time) to the customer's device 106. In step 302, the customer activates the app on their device 106, in response to the data. In step 304, the screen displays an alert in block 404 of screen 400, including the monetary amount of the requested transaction. In step 305 the location of the user's device 106, is requested. If the location request is successful, the algorithm proceeds to step 306 where the latitude and longitude coordinates of the user's device 106 are displayed in block 408. If the address request fails, the algorithm proceeds to step 308, where a message is displayed indicating the app is unable to get the location information. After step 306, the algorithm proceeds to step 307, where the location 104 based on the business address is requested. If the address request fails, the algorithm proceeds to step 308, where a message is displayed indicating the app is unable to get the location information. After step 308, the algorithm proceeds to step 310 where the allow button 414 and deny button 418 are displayed in block 412.

If the business location request is successful, the algorithm proceeds to step 309, where the VIEW MAP button 416 is displayed in block 412 and the latitude and longitude coordinates of both the business location 104 and the user's device 106, as well as the distance and direction between the business location 104 and the user's device 106, are displayed in block 408. The algorithm then proceeds to step 311, where the distance between the business location 104 and the user's device 106 is calculated. When a straight-line calculation using the Pythagorean Theorem is used, the error using this method increases with distance, requires special handling of certain location combinations, and the result is the distance if going through the Earth. The preferred method, therefore, computes the distance of the Great Circle distance between them. This calculation is known as the Haversine Formula. The algorithm then proceeds to step 312, where the two locations are used to determine the compass bearing of the business location 104 from the user's device 106. If the device 106 includes the GPS unit 109 the geolocation services may provide a function for determining the bearing as a Great Circle bearing. In a "flat-earth" map display the Great Circle bearing appears to be incorrect, as East-West lines arc towards the pole. Since the financial card protection system will use the device geolocation services for displaying flat earth maps, a Rhumb Line bearing calculation is used that provides a more correct-looking direction. This calculation is also available from the Aviation Formulary by Ed Williams. The bearing may be displayed as a value between 0 to 360 degrees, or more preferably, as a direction (i.e. ENE) in block 408 of screen 400. The bearing is also converted to a compass point direction, as described with respect to FIG. 5, below. The distance is also displayed in block 408 of screen 400, in the units the customer has chosen, (either SAE or metric).

After the distance and bearing have been computed in step 312, the process continues in step 313, where it is determined if the distance computed is greater than, for example, one mile (or kilometer). If the distance computed is greater than, for example, one mile (or kilometer), then in step 315, the distance displayed in block 408 is in miles (or kilometers). If the distance computed is less than, for example, one mile, then in step 314, the distance displayed in block 408 is in feet (or meters). After displaying the distance, the process proceeds to step 316, where the computed distance is compared to a maximum distance the customer has preselected. If the computed distance is less than the preselected maximum distance, the process continues to step 317, where the suggestion to accept the transaction is displayed in block 410 of screen 400. If the computed distance is greater than the preselected maximum distance, the process continues to step 318, where the suggestion to deny the transaction is displayed in block 410 of screen 400. Once the appropriate suggestion has been displayed, the process continues to step 310 where the accept button 414 and deny button 418 are displayed in block 412 of screen 400. The buttons 414 and 418 are placed side by side with an amount of separation therebetween to minimize the customer possibly touching the wrong button. To further minimize the customer possibly touching the wrong button, the buttons 414 and 418 may be of different colors. After all appropriate buttons and available information have been displayed, in step 320, the customer must make a selection. If the customer does not make a selection before timeout is reached (step 218), then the process continues to step 222 where the customer's settings are checked, as described above. If the customer presses one of the buttons 414 or 418, the prompt is changed to inform the customer they must touch the button again to select it. The button color may also change to indicate it has been selected. These changes aid the customer in case they pressed the wrong button or had a quick change of decision. When either button 414 or 418 has been touched twice the app sends the response back to the financial company server 102. The two buttons 414 and 418 are then removed from the screen and a message is displayed as to which decision was sent to the company. If the customer selected accept button 414, then the process proceeds to step 208 and continues as described above. If the customer selected deny button 418, then the process proceeds to step 210 and continues as described above.

Figure 5:
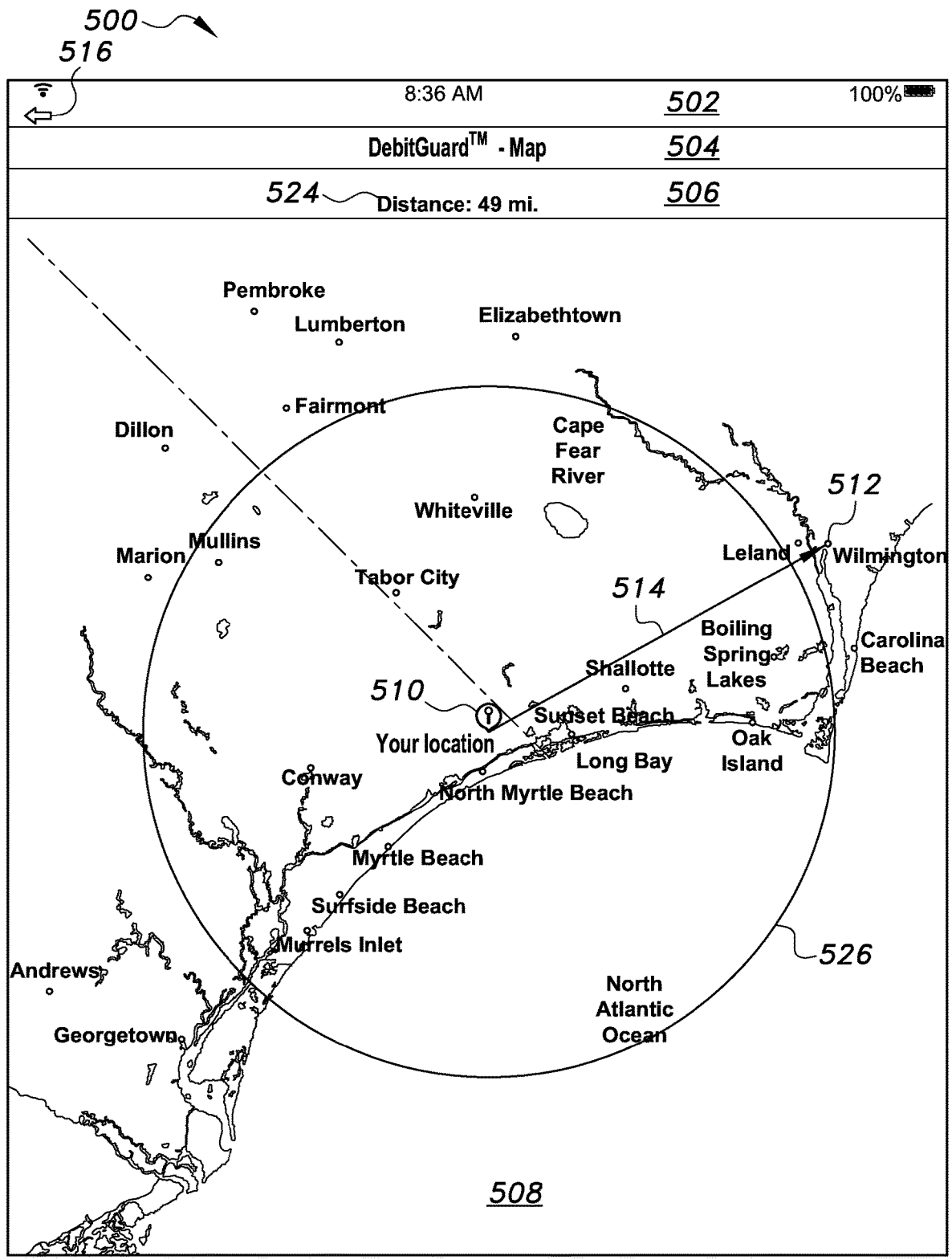
FIG. 5 is a front view of the customer's device, showing a map of the financial card protection system displayed thereon.

If the map is available, then the VIEW MAP button 416 is displayed in block 412 of screen 400. Thus the customer has the option of selecting the VIEW MAP button, as well as the allow 414 and deny 418 transaction buttons. If the customer selects (presses) the VIEW MAP button, then the map is displayed in step 322, as is shown in FIG. 5. The map display screen 500 includes a block 502 for displaying a BACK button 516 and other device-based information. The map display screen 500 further includes: a block 504 that displays "DebitGuard™ Map," to indicate the screen displayed; a block 506 that includes a display of the computed distance 524; and a block 508 that includes a map centered on a user icon 510 indicating the location of the user's device 106, and also showing a business icon 512 showing the location of the business 104, and a compass point direction 514, between the two. Customers usually do not memorize all the street and address numbers in their town or in any place they visit. By providing the map, customers get a comprehension of the transaction business location in relation to themselves. The app provides the customer with the ability to zoom in or out on the map display, to account for transaction business that may be very close or very far away. Once the customer has finished using the map, selecting the BACK button returns the app to the main acceptance/rejection screen 400 at step 320 and the process continues as described above.

Returning to FIG. 4, in addition to the other virtual buttons, a SAVE DATA button 420 is displayed in block 412 of screen 400. This button allows the customer to copy the data to a device central location. Devices typically do not allow apps to directly access data created by other apps because of multiple security and privacy concerns. Such control is commonly called "Sandboxing" and is implemented at the operating system level. Devices do offer a method of copying data to a separated area which can be accessed by other apps through system calls. This area is called the clipboard. If the customer wants to save the data, with a single touch of the SAVE DATA button 420 the data is copied to the clipboard. The customer then has the choice of whatever other app they want to use with the data, such as text messaging or email, avoiding the system imposed application boundaries. A mechanism for saving notification data can also be made on the company-side software, but it is assumed the company will have the data available on their online website. The financial card protection system is mainly designed for quick handling of transaction responses.

In addition, in block 402 of screen 400, an EXIT or BACK button 422 is displayed. Touching this button returns the customer to the bank app main screen (not shown). Since the notification has been handled, the customer cannot go back to the alert page screen 400 that they exited from.

The customer has the ability to set certain customer preferred settings. For example, the customer can set SAE or metric as distance units. For setting the preselected maximum distance value a map similar to the one shown in FIG. 5 is presented. The center of the map is the customer's current location. On the screen a slider button may be provided. Moving the slider button expands or contracts the circle 526 on the map. Alternatively, the circle 526 itself may act as the slider button. The circle has a radius equal to the preselected maximum distance from the customer. When the customer selects the BACK button 516 on the map screen the distance selected is stored. This is the preselected maximum distance value used as described above. It is important to note that this distance setting is in relation to the customers' device's 106 current location. It is not a distance from their home. The financial card protection system does not include information about the customer's home address. Such information would only be needed if the customer cannot be contacted, which means the app would not be activated.

A TEST button may also be available in the main bank app, which takes the customer to a system TEST screen (not shown). Device apps typically need approval to access system services such as location and geolocation services. Testing that the company app can access these services is needed to insure the app will function correctly when needed. The Test screen will obtain location information using the same code as the app main screen uses. The screen first retrieves and displays the customer location. After that, the screen waits for the customer to input an address. On using a BACK button the system will retrieve the address location. The distance and bearing are retrieved. A map is displayed on the lower part of the screen showing the user and address locations, just as the map screen 500 does. The user can replace the address with another address at any time. If an address location cannot be obtained a suitable message is displayed.

It is possible, in the event of stolen card information, to have multiple attempts to use the card in a short amount of time. If more than one notification reaches the device before the first can be handled by the customer, when the customer activates the app an AUTO RESPOND button 424 is displayed. This button only needs a single touch to send the response. The response is based solely on the distance setting. The system to improve protection of financial cards 100 would send ACCEPT or DENY based on if the transaction were inside or outside the preselected maximum distance. The customer can then proceed to the next notification. In this way, the customer can quickly handle the situation. Note that other notifications may come from the financial company. Should a large number of notifications be sent to the device in a short time, (such as during a Denial-Of-Service (DOS) attack) an ALWAYS DENY button 426 can be displayed. This button would send a message to the company to set always deny as described above, thereby locking use of the card. The effect would also shut down transaction notification transmissions related to the app. The customer can later access the company online website to change the setting if desired. Also note that the financial company may have detection methods in use and may quickly shut down the card under its criteria for card usage.

Other settings for the system may be accessed on the financial company's online site. These include the always deny and always approve settings described above. In addition, the preselected "approve if cannot be reached," or "deny if cannot be reached" settings can also be set on the financial company's online site, as well as an immediately deny the request setting, should the card be lost or stolen, or if the customer simply wants to lock use of the card. It should be noted that regardless of the use of specific words such as "Accept," "Allow," "Reject," or "Deny," on buttons, the bank and the customer can always dispute the transaction at a later date.

It is to be understood that the system and method for doing something is not limited to the specific embodiments described above but further encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A financial card protection system, comprising:

a financial company server having computer readable memory with bank-side operations software stored thereon;

a financial card assigned to at least one customer; and at least one mobile electronic device having computer readable memory with a customer side operations application stored thereon and a display screen, wherein when a transaction request for the financial card is received by the financial company server, the bank-side operations software automatically sends an alert message to the at least one mobile electronic device over a network, the alert message configured to be displayed on the display screen of the at least one mobile electronic device, the alert message including data representative of a location of a transaction request for the financial card at a business, after receiving the alert message, the application displays the alert message on the display screen of the at least one mobile electronic device, prompting the at least one customer to activate the application for further processing, and when activated, the application causes further processing on the at least one mobile electronic device, including:

determining and displaying on the display screen a determined distance between the location of the transaction request for the financial card and a location of the at least one mobile electronic device, displaying an accept request button and a deny request button on the display screen of the at least one mobile electronic device, and displaying an accept request suggestion on the display screen of the at least one mobile electronic device when the determined distance is less than a preselected maximum distance, or displaying a deny request suggestion on the display screen of the at least one mobile electronic device when the determined distance is greater than the preselected maximum distance, displaying a selectable view map button on the display screen of the at least one mobile electronic device, and when the at least one customer selects the view map button, the application further displays:

a map on the display screen of the at least one mobile electronic device, the map including a user icon indicating the location of the at least one mobile electronic device, a business icon indicating a location of the business, and a compass point direction indicator that graphically shows a compass direction of the displayed location of the business relative to the displayed user icon, the map having a circle having an adjustable radius with a preselected maximum radius for a transaction request, the adjustable radius being selectively adjusted by the at least one customer using an adjustable slider displayed on the display screen of the at least one mobile electronic device, wherein, subsequent to the customer selection of the view map button and the map being displayed on the display screen, the application sends an accept transaction message to the server over the network when the customer selects the accept request button, or the application sends a deny transaction message to the server over the network when the customer selects the deny request button.

2. The financial card protection system as recited in claim 1, wherein when activated, the application causes further processing on the at least one mobile electronic device, including displaying an auto respond button on the display screen of the at least one mobile electronic device.

3. The financial card protection system as recited in claim 2, wherein when the at least one customer selects the auto respond button, the application causes further processing on the at least one mobile electronic device to automatically send the accept transaction message to the server over the network when the determined distance is less than the preselected maximum distance, or the application causes further processing on the at least one mobile electronic device to send the deny transaction message to the server over the network when the determined distance is greater than the preselected maximum distance.

4. The financial card protection system as recited in claim 1, wherein, when activated, the application causes further processing on the at least one mobile electronic device to display a save data button on the display screen of the at least one mobile electronic device.

5. The financial card protection system as recited in claim 4, wherein when the at least one customer selects the auto respond button, the application causes further processing on the at least one mobile electronic device to save data related to the transaction request for the financial card to a clipboard of the at least one mobile electronic device.

6. The financial card protection system as recited in claim 1, wherein the bank-side operations software:
  starts a timeout counter when it automatically sends the alert message to the at least one mobile electronic device;
  compares the timeout counter to a preset timeout limit; and
  when the customer does not make a selection before the preset timeout limit is reached, a customer timeout setting is checked.

7. The financial card protection system as recited in claim 6, wherein when the customer timeout setting is approved when it cannot be reached, the bank-side operations software sends an allow transaction response to the location of the transaction request, or when the customer timeout setting is denied when it cannot be reached, the bank-side operations software sends a deny transaction response to the location of the transaction request.

8. The financial card protection system as recited in claim 1, wherein when the application causes further processing on the at least one mobile electronic device to send the accept transaction message to the server over the network, the bank-side operations software sends an allow transaction response to the location of the transaction request, or when the application causes further processing on the at least one mobile electronic device to send the deny transaction message to the server over the network, the bank-side operations software sends a deny transaction response to the location of the transaction request.

9. The financial card protection system as recited in claim 1, wherein when the data representative of the location of the transaction request is not available, the application causes further processing on the at least one mobile electronic device to display a message on the display screen of the at least one mobile electronic device indicating that the application is unable to obtain the location of the transaction request.

10. The financial card protection system as recited in claim 1, wherein the determined distance is equal to a Great Circle distance between the location of the transaction request for the financial card and the location of the at least one mobile electronic device.

11. The financial card protection system as recited in claim 1, wherein the determined distance is displayed on the display screen of the at least one mobile electronic device in SAE units.

12. The financial card protection system as recited in claim 11, wherein when the determined distance is less than one mile, the determined distance is displayed on the display screen of the at least one mobile electronic device in feet.

13. The financial card protection system as recited in claim 11, wherein when the determined distance is more than one mile, the determined distance is displayed on the display screen of the at least one mobile electronic device in miles.

14. The financial card protection system as recited in claim 1, wherein the determined distance is displayed on the display screen of the at least one mobile electronic device in metric units.

15. The financial card protection system as recited in claim 14, wherein when the determined distance is less than one kilometer, the determined distance is displayed on the display screen of the at least one mobile electronic device in meters.

16. The financial card protection system as recited in claim 14, wherein when the determined distance is more than one kilometer, the determined distance is displayed on the display screen of the at least one mobile electronic device in kilometers.

17. The financial card protection system as recited in claim 1, wherein the bank-side operations software retrieves customer settings prior to sending the alert message to the at least one mobile electronic device.

* * * * *